3,046,275
N-SUBSTITUTED 2-PHENYL-7-AMINOALKOXY CHROMONES

Erwin Kohlstaedt, Frankfurt am Main, and Karl-Heinz Klingler, Langen, Hesse, Germany, assignors to Chemiewerk Homburg Zweigniederlassung der Deutschen Gold- and Silber-Scheideanstalt vormals Roessler, Frankfurt am Main, Germany
No Drawing. Filed May 27, 1959, Ser. No. 816,056
Claims priority, application Germany May 30, 1958
13 Claims. (Cl. 260—247.7)

This invention relates to N-substituted 2-phenyl-7-aminoalkoxy chromones and to a process for preparing them.

German patent specification No. 1,018,874 describes the production of N-substituted 2-methyl-7-aminoalkoxy-chromones by reacting an alkali metal salt of 2-methyl-7-hydroxychromone with a basically substituted alkyl halide. From a pharmacological point of view, the products are characterised by khellin-like properties, but they have a greater therapeutic range and better solubility in water than khellin (2-methyl-5,8-dimethoxy-furanochromone).

It has now been found that N-substituted 2-phenyl-7-aminoalkoxy-chromones can be produced in an analogous manner from 2-phenyl-7-hydroxychromone and basically substituted alkyl halides.

According to the present invention therefore there is now provided a process of preparing N-substituted 2-phenyl-7-aminoalkoxy chromones, which comprises reacting an alkali metal salt of 2-phenyl-7-hydroxy chromone with a basically substituted alkyl halide in the presence of an inert organic solvent, such as dioxane.

The reaction is preferably carried out at a temperature of from 90° C. to 100° C.

The N-substituted 2-phenyl-7-aminoalkoxy chromones in the form of their salts are as water-soluble as the N-substituted 2-methyl-7-aminoalkoxy chromones described in German patent specification No. 1,018,874 and their pharmacological properties are superior to the latter compounds. This is particularly apparent when comparing the musculotropic spasmolytic effect of the two types of chromone on the intestine of a guinea pig. The phenyl chromones have a considerably stronger action in all cases and are less toxic than the analogous methyl derivatives. This is apparent from the data given in the following table:

PHARMACOLOGICAL COMPARISON OF COMPOUNDS OF THE FORMULA

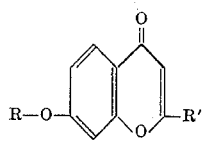

| R | R' | Musculotropic-spasmolytic effect compared with Papaverine | $LD_{50}$ in mg./kg. i.p. white mouse according to Miller and Tainter |
|---|---|---|---|
| CH₃\N—CH₂—CH₂—CH₂—/CH₃ | —CH₃ | 0.017 | 155 |
| CH₃\N—CH₂—CH₂—CH₂—/CH₃ | —C₆H₅ | 0.63 | 312 |
| ◯N—CH₂—CH₂— | —CH₃ | 0.03 | 13 |
| ◯N—CH₂—CH₂— | —C₆H₅ | 0.56 | 225 |
| CH₃\N—CH₂—CH₂—/CH₃ | —CH₃ | 0.04 | 382 |
| CH₃\N—CH₂—CH₂—/CH₃ | —C₆H₅ | 0.47 | 403 |
| C₂H₅\N—CH₂—CH₂—/C₂H₅ | —CH₃ | 0.037 | 207 |
| C₂H₅\N—CH₂—CH₂—/C₂H₅ | —C₆H₅ | 0.44 | 259 |
| O◯N—CH₂—CH₂— | —CH₃ | 0.04 | 820 |
| O◯N—CH₂—CH₂— | —C₆H₅ | 0.26 | >1,500 |

All the N-substituted 2-phenyl-7-aminoalkoxy chromones investigated were found to have an equally good coronary dilating action on an isolated guinea pig's heart as that of the corresponding methyl chromones; in some cases, however, the phenyl chromones were found to be more effective than the corresponding methyl chromones. Thus 4'-methoxy-2-phenyl-7-(N-dimethylaminoethoxy)-chromone-hydrochloride shows a particularly strong coronary dilating action on an isolated guinea pig's heart amounting to approximately 7 times that of theophyllin without producing a negatively inotropic effect which is always observed with the corresponding methyl chromones.

Experiments were also carried out on an isolated perfused rabbit's ear for the purpose of comparing the effect of the 2-phenyl and 2-methyl chromones on the peripheral blood vessels. In these experiments, 100 units of 7-piperidinoethoxy-2-phenyl-chromone-hydrochloride acted approximately 4 times as strongly as 100 units of 7-piperidinoethoxy-2-methyl-chromone-hydrochloride.

The 2-phenyl radical in the compounds according to the present invention may be substituted. Alkoxy groups, particularly the methoxy group, are preferred substituents. Those compounds are preferred in which the alkoxy group is the p-position with respect to the carbon atom of the phenyl radical which is attached to the chromone nucleus.

In order that the invention may be more clearly understood the following examples are given by way of illustration only:

Example 1

1.15 g. of sodium are dissolved in 65 cc. of absolute methanol and 12 g. of 7-hydroxy-2-phenyl-chromone are then added. The solvent is distilled off in vacuo on a water bath and the residue is taken up in 95 cc. of absolute dioxane. A solution of 6.7 g. of N-γ-dimethylaminopropyl chloride in 20 cc. of absolute dioxane is then added, the mixture is stirred for 4 hours at an internal temperature of from 90° C. to 100° C. and then the dioxane is distilled off in vacuo. The residue is stirred with water, filtered with suction after standing for a short time, washed with water and dried in desiccator. The base thus obtained is dissolved in absolute ethyl alcohol and slightly acidified with alcoholic hydrochloric acid. After cooling, the pure 2-phenyl-7-(N-γ-dimethylaminopropoxy)-chromone hydrochloride is filtered off with suction and dried in a spray drier at 130° C. 7.5 g. are obtained with a melting point of 219–220° C.

*Example 2*

The procedure is analogous to that employed in Example 1, but the N-γ-dimethylaminopropyl-chloride is replaced by N-β-chloroethyl-piperidine. Starting from 20 g. of 7-hydroxy-phenyl-chromone, there are obtained 22 g. of 2-phenyl-7-(β-piperidinoethoxy)-chromone-hydrochloride, which melts at 248–249° C. after being recrystallised from ethyl alcohol.

*Example 3*

The procedure is analogous to that employed in Example 1, but the N-γ-dimethylaminopropyl-chloride is replaced by N-β-dimethylaminoethyl-chloride. The melting point of the 2-phenyl-7-(N-β-dimethylaminoethoxy)-chromone-hydrochloride which is obtained is 216–220° C.

*Example 4*

The procedure is analogous to that employed in Example 1, but the N-γ-dimethylaminopropyl-chloride is replaced by N-β-diethylaminoethyl-chloride. The melting point of the resulting 2-phenyl-7-(N-β-diethylaminoethoxy)-chromone-hydrochloride is 187–188° C.

*Example 5*

The procedure is analogous to that employed in Example 1, but the N-γ-dimethylaminopropyl-chloride is replaced by N-β-chloroethyl-morpholine. 2-phenyl-7-(N-β-morpholinoethoxy)-chromone-hydrochloride is obtained with a melting point of 253–254° C.

*Example 6*

7.7 g. of 7-hydroxy-4'-methoxy-2-phenyl-chromone are added to a solution of 0.66 g. of sodium in 100 cc. of absolute methanol. The mixture is stirred until the chromone has dissolved and then evaporated to dryness in vacuo. The residue is triturated in a mortar, suspended in 75 cc. of pure dioxane and then 3.4 g. of N-β-dimethylaminoethyl-chloride are added thereto. The mixture is boiled for 3 hours under reflux while stirring, the dioxane is distilled off in vacuo and the residue is extracted with ether. The base obtained after distilling off the ether has a melting point of 118–119° C. and is converted into the hydrochloride by dissolving it in ethanol, acidifying with alcoholic hydrochloric acid and precipitating with absolute ether. In this way, there are obtained 8 g. of 4'-methoxy-2-phenyl-7-(N-β-dimethylaminoethoxy)-chromone-hydrochloride, which is purified by recrystallisation from isopropyl alcohol. The melting point of the product is 220–221° C.

*Example 7*

10 g. of 7-hydroxy-4'-methoxy-flavone are converted into the sodium salt and the sodium salt is suspended in 100 cc. of dioxane. 5.45 g. of dimethylaminopropyl chloride dissolved in a little dioxane are added dropwise to the suspension of the sodium salt at a temperature of 80° C. The mixture is then boiled for 2 hours under reflux, filtered, acidified with alcoholic hydrochloric acid and the crude product is filtered with suction after standing for a short time. After recrystallisation from ethanol, there are obtained 10.3 g. of 2-(p-methoxyphenyl)-7-dimethylaminopropoxy-chromone hydrochloride with a melting point of 231–233° C.

The following compounds were also obtained in an analogous manner:

(1) 2 - (p-methoxyphenyl) - 7-piperidinoethoxy-chromone-hydrochloride with a melting point of 237–238° C.

(2) 2 - (p-methoxyphenyl)-7-diethylaminoethoxy-chromone hydrochloride with a melting point of 231–233° C.

(3) 2 - (p-methoxyphenyl)-7-pyrrolidinoethoxy-chromone-hydrochloride with a melting point of 236–238° C.

(4) 2 - (p-methoxyphenyl)-7-pyrrolidinopropoxy-chromone-hydrochloride with a melting point of 230–232° C.

What we claim is:
1. A compound of the formula

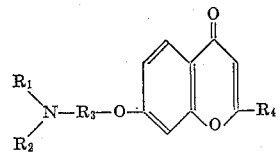

wherein the

group represents a member selected from the group consisting of di-lower alkyl amino, piperidino, pyrrolidino and morpholino, $R_3$ is an alkylene chain having 2–3 carbon atoms and $R_4$ is a member selected from the group consisting of phenyl and p-methoxy phenyl.

2. A compound according to claim 1 in the form of its pharmaceutically acceptable non-toxic acid addition salt.

3. 2-phenyl-7-(N-γ-dimethylaminopropoxy)-chromone.
4. 2-phenyl-7-(β-piperidinoethoxy)-chromone.
5. 2-phenyl-7-(N-β-dimethylaminoethoxy)-chromone.
6. 2-phenyl-7-(N-β-diethylaminoethoxy)-chromone.
7. 2-phenyl-7-(N-β-morpholinoethoxy)-chromone.
8. 4'-methoxy-2-phenyl-7-(N-β-dimethylaminoethoxy)-chromone.
9. 2 - (p-methoxyphenyl) - 7 - dimethylaminopropoxy-chromone.
10. 2-(p-methoxyphenyl)-7-piperidinoethoxy-chromone.
11. 2 - (p-methoxyphenyl)-7-diethylaminoethoxy-chromone.
12. 2 - (p - methoxyphenyl)-7-pyrrolidinoethoxy-chromone.
13. 2 - (p-methoxyphenyl)-7-pyrrolidinopropoxy-chromone.

References Cited in the file of this patent

UNITED STATES PATENTS

| | | |
|---|---|---|
| 2,848,449 | Sommers | Aug. 19, 1958 |
| 2,854,379 | Fancher | Sept. 30, 1958 |
| 2,861,992 | Lassauniere | Nov. 25, 1958 |
| 2,897,211 | Da Re | July 28, 1959 |
| 2,955,073 | De Beer | Oct. 4, 1960 |

FOREIGN PATENTS

| | | |
|---|---|---|
| 1,018,874 | Germany | Nov. 7, 1957 |

UNITED STATES PATENT OFFICE
CERTIFICATE OF CORRECTION

Patent No. 3,046,275                            July 24, 1962

Erwin Kohlstaedt et al.

It is hereby certified that error appears in the above numbered patent requiring correction and that the said Letters Patent should read as corrected below.

Column 1, line 71, for "13" read -- 135 --; column 2, line 38, for "dialating" read -- dilating --.

Signed and sealed this 13th day of November 1962.

(SEAL)
Attest:

ERNEST W. SWIDER
Attesting Officer

DAVID L. LADD
Commissioner of Patents